Patented July 4, 1944

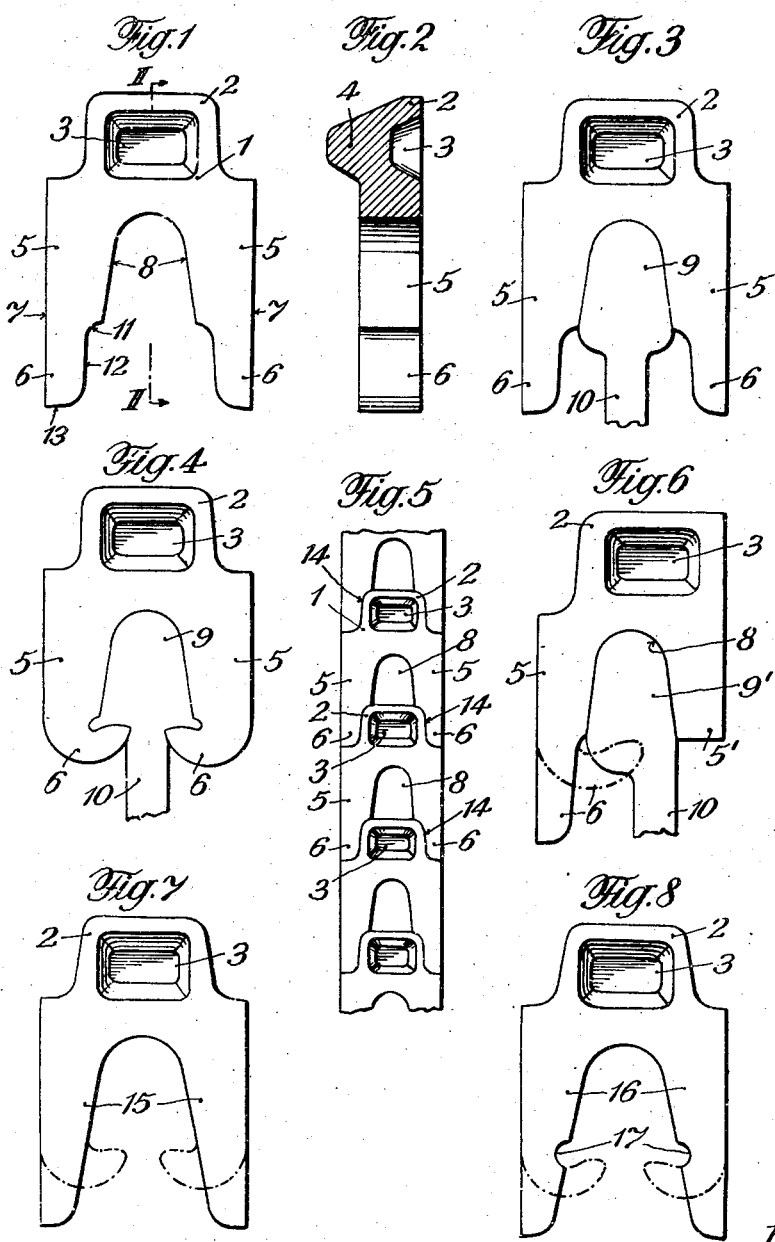

2,353,106

UNITED STATES PATENT OFFICE 2,353,106

SEPARABLE FASTENER

Martin Winterhalter, Morcote, near Lugano, Switzerland

Application February 17, 1942, Serial No. 431,200
In Switzerland November 11, 1941

7 Claims. (Cl. 24—205)

This invention relates to separable fasteners and more particularly to fastener elements used in the manufacture of separable fasteners and which are destined to be attached to the reinforced edge of a band-shaped flexible carrier or tape.

Such fastener elements usually have an interlocking head portion provided with a recess in one face and with a projection at the opposite face, and two tape gripping jaws by means of which the fastener element is attached to the edge of the tape. Fastener elements of this type are known which have V-shaped diverging jaws the free ends of which are provided with an inwardly directed projection. When attaching the fastener element to the tape, this latter is introduced with its reinforced edge between the jaws of the fastener element and the jaws are then squeezed together, so that the projection on their free ends close behind the reinforced edge of the tape and firmly secure the fastener element to the tape.

In order to make fastener elements of this type they are usually cut from a strip of sheet material, either with the jaws cut out immediately in V-shaped diverging relation, or with the jaws extending in the direction of the axis of the metal strip, the outer edges of the jaws being formed by the edges of the strip. In the first case, cutting out of the fastener elements with diverging jaws results in a considerable waste of strip material, the material between the two jaws and between the diverging jaws and the edges of the strip being lost. In the second case the two parallel jaws must be spread apart before they can be placed astride the thickened edge of the tape; but the repeated bending by spreading apart and successively squeezing together the jaws of the fastener elements weakens these jaws at the place where the bending action is applied, that is at the inner end or base of the jaws near the head portion of the element, so that when the finished fastener made with such elements is subjected to traction tending to separate the elements from the tape, the jaws subjected to bending stress can easily open and fall off from the tape.

The object of the present invention is to avoid this disadvantage and to provide fastener elements for separable fasteners which can be produced with a minimum waste of material.

In the accompanying drawing showing several forms of fastener elements according to the invention, Fig. 1 is a plan view of a fastener element before being secured to a tape.

Fig. 2 is a section along the line II—II of Fig 1.

Fig. 3 shows the fastener element placed on the thickened edge of a tape.

Fig. 4 shows the fastener element after being secured to the tape.

Fig. 5 shows the manner of cutting the fastener elements from a strip of sheet material.

Figs. 6, 7 and 8 show each a further form of a fastener element according to the invention.

The fastener element 1, shown in Fig. 1, is punched out from a strip of sheet material the width of which corresponds to the greatest width of the element. This fastener element comprises an interlocking head portion 2 provided with a recess 3 on one of its faces and with a projection 4 on the other face. From this head portion extend two gripping jaws in the direction of the longitudinal axis of the element, each jaw being formed of a larger inner or base portion 5 and of a narrower outer or end portion 6. The outer edges of both jaw portions are formed by straight parallel lines 7 which are formed by the edges of the metal strip from which the elements are punched out. Between the two jaw portions 5 an opening 8 is formed which is rounded on the side of the head portion; this opening 8 is destined to receive the reinforced edge 9 of the tape 10 to which the fastener elements will be secured. Following this opening the inner edge of the jaws forms a shoulder 11 and then continues in a straight, slightly outwardly inclined line 12 until the outer end of the jaws, where it merges by means of a rounded portion 13 into the straight outer edge of the jaw. The end portions 6 of the jaws thus have a smaller cross sectional area than the jaw portions 5 and consequently they are less resistant to bending stress than the larger portions 5 joining the head portion 2 of the fastening element.

In order to attach the described fastening element to the tape 10, the reinforced edge 9 of the tape is introduced in the opening 8 of the fastener element, as shown in Fig. 3. Then the weaker jaw portions 6 are bent inwardly as represented in Fig. 4 so that they clamp the tape between themselves and enclose the edge 9 in the opening 8. Bending of the jaw portions 6 does not influence the relatively stronger portions 5 of the jaws, and the place where the jaws join the head portion 2 is not weakened by any bending operation, as it is the case with fastening elements having V-shaped diverging jaws, or jaws which have been spread open before introduction of the tape between them.

Fig. 5 serves to explain the manner in which the described fastener elements are punched out in successive relation from a strip of sheet material. In order to produce the elements it is only necessary to stamp the recesses 3 and corresponding projections 4, to punch out the openings 8 and then to sever the strip transversely along lines 14. This line 14 forms simultaneously the inner edge of the two jaw portions 6 of a fastener element and the outer edge of the head portion 2 of the next following element. In this manner a minimum loss of strip material is obtained, only the material cut out for forming the opening 8 being lost.

In the example according to Fig. 6 only one of the jaws of the fastener element comprises an end portion 6 of relatively weaker section than the inner jaw portion 5, while the other jaw 5' is shorter and comprises a single portion extending over the length of the jaw portion 5. The tape 10 destined to carry these elements is formed with an eccentric reinforced edge 9' which is introduced into the opening 8 between the jaw portions 5 and 5'. In order to secure this fastener element to the tape, the relatively weaker jaw portion 6 is bent inwardly as shown in dash and dot lines in Fig. 6 so that the tape is clamped between the bent over portion 6 and the jaw 5', and the reinforced edge 9' of the tape prevents the fastening element from being separated from the tape.

In the example according to Fig. 7 the width of the two jaws 15 is gradually decreasing towards the free end thereof so that the end portions of the jaws are of a weaker cross section than the inner portions joining the head portion 2 and can be bent inwardly as shown in Fig. 7. According to Fig. 8 the end portion of each jaw of the fastening element is provided with a notch 17 so as to form a place of weaker cross section permitting bending of the end portions of the jaws as represented in dash and dot lines.

While I have shown and described certain preferred constructions of my improved fastener elements for separable fasteners, it is obvious that I do not wish to be limited thereto and that changes may be made in the arrangement and form of the parts without departing from the principle of the present invention as comprehended within the scope of the appended claims.

I claim:

1. A fastener element for separable fasteners consisting of a sheet metal punching comprising an interlocking head at one end and tape gripping jaws at the other end, the outside edges of said jaws being substantially straight and parallel to each other, the inside edges of said jaws being so shaped so as to adapt the beaded edge portion of a tape to be snugly received for substantially the width of said edge portion between the base portions of said jaws without bending of said base portions to cause such reception, said inside edges of said jaws also diverging from each other so as to taper said jaws transversely toward the jaw ends to form jaw end portions of weaker cross-section than the jaw base portions adapted to be bent inwardly by application of a bending force applied thereto to bring the jaw ends into clamping engagement with the tape without the force so applied causing bending of the jaw base portions.

2. A fastener element according to claim 1 in which the inside edge of each of said jaws is so shaped as to form an abrupt decrease in the transverse width of the jaw adjacent the outer end of its base portion adapted to establish a definite place of bending of the jaw with relation to the beaded edge of the tape.

3. A fastener element according to claim 1 in which the inside edge of each of said jaws is so shaped as to form a notch causing an abrupt decrease in its transverse width adjacent the outer end of its base portion adapted to establish a definite place of bending of the jaw with relation to the beaded edge of the tape.

4. A fastener element for separable fasteners comprising an interlocking head at one end and tape engaging jaws at the other end, at least one of said jaws being formed to provide intermediate its length an abrupt decrease in its transverse width adapted to establish a definite place of bending of the outer end portion of the jaw relative to its base portion upon application of a bending force to said end portion for forcing the latter into gripping engagement with the tape.

5. A fastener element according to claim 4 in which the inside edge of each of the jaws is so shaped as to adapt the beaded edge portion of a tape to be snugly received between said jaws for substantially the width of said edge portion without bending of the base portions to cause such reception.

6. A fastener element for separable fasteners comprising an interlocking head at one end and tape gripping jaws at the other end, the inside edges of said jaws being so shaped as to adapt the beaded edge portion of a tape to be snugly received for substantially the width of said edge portion between the base portions of said jaws without bending of said base portions to cause such reception, said inside edges also being each formed with a notch adapted to establish a definite place of inward bending of the outer end portions of the jaws relative to the base portions upon application of a bending force to said end portions for bringing the latter into clamping engagement with the tape.

7. A fastener element for separable fasteners comprising an interlocking head at one end and tape gripping jaws at the other end, the inside edges of said jaws being so shaped as to adapt the beaded edge portion of a tape to be snugly received for substantially the width of said edge portion between the base portions of said jaws without bending of said base portions to cause such reception, said jaws each having an end portion of lesser transverse width than its base portion forming an abrupt shoulder between the two portions adapted to establish a definite place of bending of said end portion relative to said base portion upon application of a bending force to the end portion for moving the latter into clamping engagement with the tape.

MARTIN WINTERHALTER.